Sept. 28, 1943.  A. V. SAMPSEL  2,330,243
LIQUID METERING DEVICE
Filed June 12, 1942   3 Sheets-Sheet 1

Inventor:
Arthur V. Sampsel
By: Frank H. Marks
Atty.

Sept. 28, 1943. A. V. SAMPSEL 2,330,243
LIQUID METERING DEVICE
Filed June 12, 1942 3 Sheets-Sheet 2
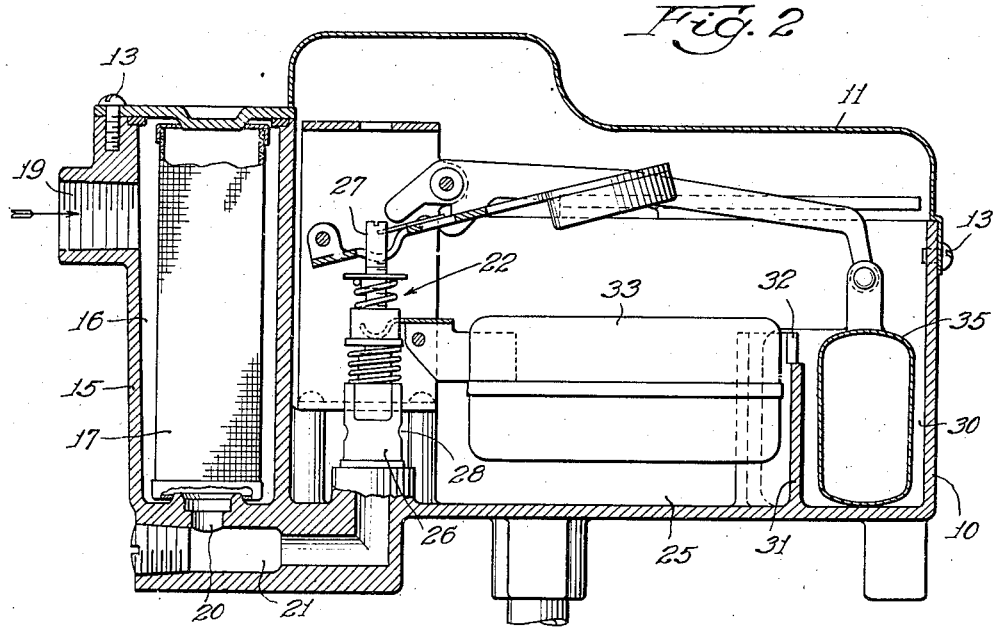
Fig. 2
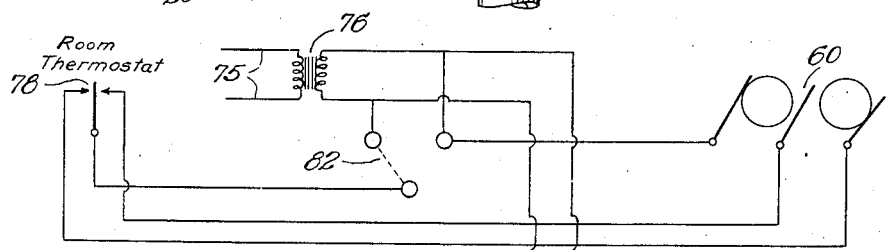
Fig. 3
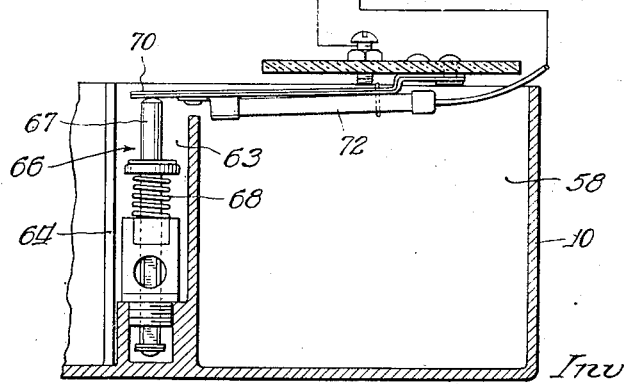
Inventor:
Arthur V. Sampsel
By: Frank H. Marks,
Atty.

Sept. 28, 1943. A. V. SAMPSEL 2,330,243
LIQUID METERING DEVICE
Filed June 12, 1942 3 Sheets-Sheet 3
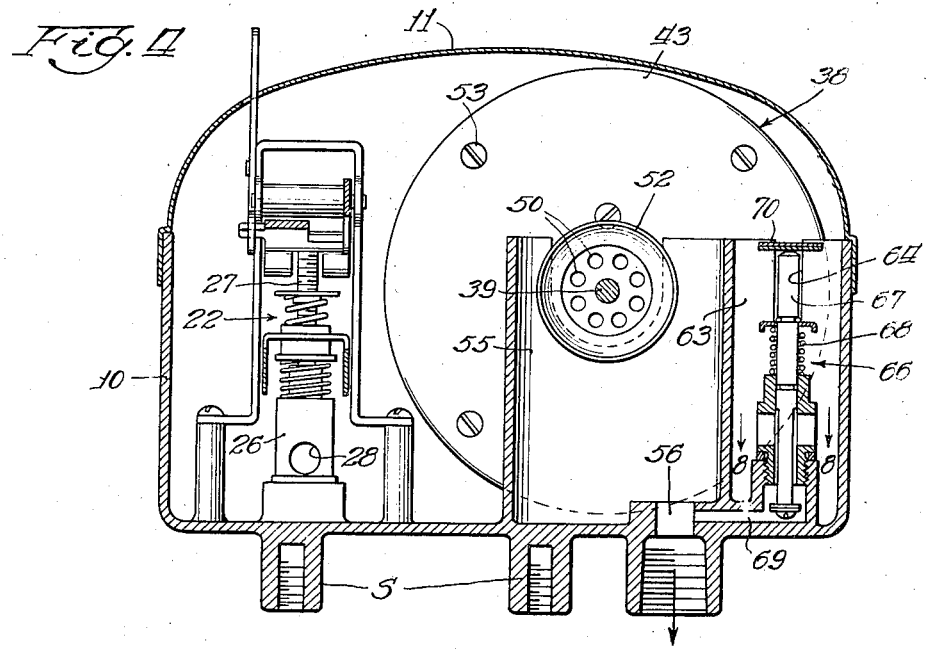
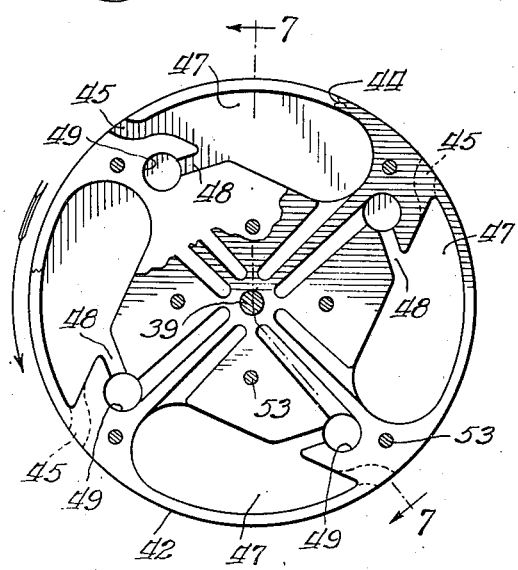
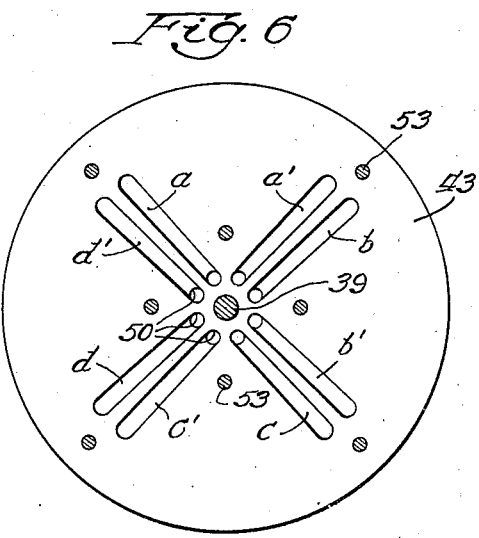
Inventor:
Arthur V. Sampsel
By:
Frank H. Marks
Atty.

Patented Sept. 28, 1943

2,330,243

UNITED STATES PATENT OFFICE 2,330,243

LIQUID METERING DEVICE

Arthur V. Sampsel, Mendota, Ill., assignor to Sears, Roebuck and Co., Chicago, Ill., a corporation of New York Application June 12, 1942, Serial No. 446,759

9 Claims. (Cl. 221—97)

My invention relates to a liquid metering device and has to do more particularly with an apparatus for measuring and delivering a constant flow of liquid. My invention is especially designed for delivering liquid fuel of relatively low specific gravity such as kerosene or other fuel oil, to combustion apparatus of any suitable type.

Another object of my invention is to provide a device of the type referred to which is capable of delivering liquid at a plurality of pre-determined rates of flow in order to satisfy different requirements, as, for example, a low feed which may be used for a pilot flame or otherwise, and a high feed.

Another object is to provide such a device wherein the liquid feed will be substantially constant. This is important in any combustion apparatus, where uncontrolled fluctuations in the heat output are always undesirable. Such fluctuations are especially undesirable in absorption refrigeration, a field to which my invention may be applied.

A further object is to provide a device of the type referred to which will have means for continuing liquid feed, though unmetered, after the electric current employed for operating the meter has been cut off.

Still another object is to provide an improved rotor or metering wheel which will be exceptionally accurate in providing a substantially constant feed.

Another object of my invention is to provide a device of the type referred to which will be simple in construction, inexpensive to fabricate, certain in operation and, in general, entirely satisfactory for the purposes desired.

Various other objects and advantages will become apparent as the description proceeds.

Reference is made to my co-pending application Serial No. 289,864, filed August 12, 1939, issued May 24, 1943, as Patent No. 2,319,830. While the devices covered by said patent are quite satisfactory, the present invention represents certain marked advantages thereover.

Turning now to the drawings forming a part of this application and illustrating a preferred embodiment, Fig. 1 is a top plan view of a metering device embodying my invention;

Fig. 2 is a vertical sectional view taken substantially along the line 2—2 of Fig. 1;

Fig. 3 is a similar sectional view taken substantially along the line 3—3 of Fig. 1, together with a diagrammatic showing of the electrical circuit employed in connection with the metering device;

Fig. 4 is a similar sectional view taken substantially along the line 4—4 of Fig. 1;

Fig. 5 is a plan view showing the inside of the metering rotor forming a part of my invention with a gasket in place thereon, a fragmentary portion of the gasket being broken away to show the construction more clearly;

Fig. 6 is a plan view of the inside of the rotor closure plate designed to cooperate with the part shown in Fig. 5;

Figure 1:
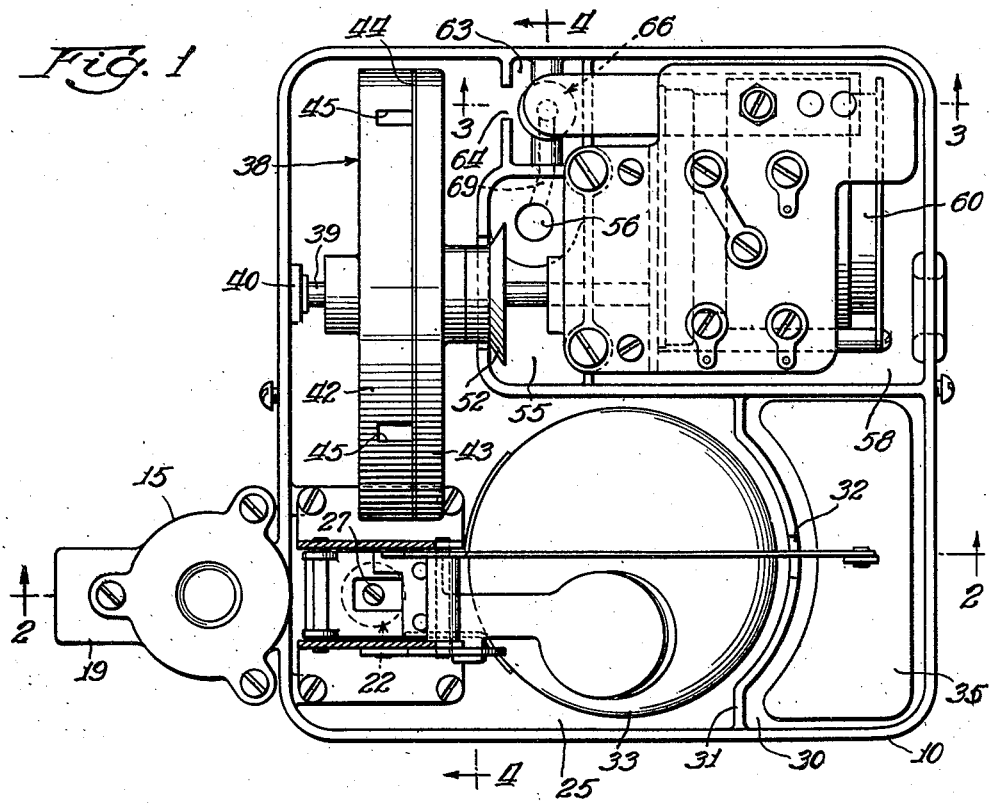
Figure 7:
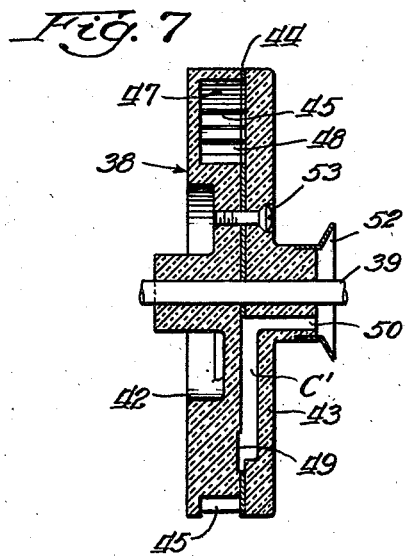
Fig. 7 is a sectional view of the rotor taken substantially along the line 7—7 of Fig. 5.
Figure 8:
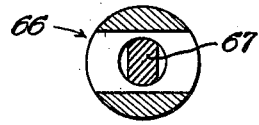
Fig. 8 is a sectional view taken substantially along the line 8—8 of Fig. 4.

The numeral 10 represents generally a receptacle which, when in use, is normally covered with a lid 11 which may be secured as by screws 13, 13. Preferably formed integrally with the receptacle 10 is a cylindrical portion 15 defining a filter chamber 16 within which is disposed a filter 17 of wire mesh or other suitable material. An oil inlet duct 19 communicates with the chamber 16.

The space within the cylindrical filter 17 communicates through a duct 20 and passage 21 to a float controlled valve mechanism indicated generally by the numeral 22 disposed in a main chamber 25. This valve mechanism comprises an upwardly extending nipple 26 within which is slidably arranged a plunger 27. The nipple is provided with outlet openings 28. The operation of this valve is controlled by a main float 33 in such a manner that when the liquid in the main chamber 25 rises to a certain level the valve 22 will be closed.

Inasmuch as the float controlled valve is substantially similar in construction and operation to the one disclosed in said patent, no detailed description here is considered necessary.

An overflow chamber 30 is separated from the main chamber 25 by means of a dam 31 which may have a notch 32 cut therein to provide a more controlled overflow of liquid after it has reached a certain level in the chamber 25. Within the overflow chamber is an overflow float 35 which is associated with the valve 22 so as to exert a double check thereon in the event that the main float 33 should fail to function. This arrangement also is substantially as shown in said patent.

Rotatably mounted within the chamber 25 is a metering rotor indicated generally by the numeral 38. This rotor has a shaft 39 one end of which seats in a suitable thrust bearing 40 arranged in the wall of the receptacle 10. The rotor is preferably formed of two parts 42 and 43 which may conveniently be molded out of a suitable plastic such as hard rubber, Bakelite, etc., with a gasket 44 of fibre or the like interposed therebetween. The part 42 is relatively thick and is provided with a plurality of peripheral openings 45 leading to chambers 47. These chambers, as clearly seen in Fig. 5, are preferably approximately tear-drop in shape tapering from the inlet 45 to the opposite end. Relatively near the inlet opening 45 each chamber 47 is also provided with a duct 48 leading to a relatively small cavity 49.

The part 43 is a relatively flat disk provided with a pair of radial channels a, a', b, b', etc., for each of the chambers 47 of the part 42. The channels a, b, c, and d communicate with the large end of the chambers 47, while the channels a', b', c' and d' communicate with the cavities 49. These channels a, a', etc., all lead inwardly to a series of passages 50 which are parallel with the axis of the rotor and disposed around the shaft 39. A cup-shaped discharge member 52 is disposed around the openings 50. The disk 43 is secured to the part 42 as by screws 53. The openings 50 may be joined together.

The gasket 44 interposed between the rotor parts 42 and 43 covers all the contacting surfaces between these elements. As seen in Fig. 5, openings are left in the gasket for the chambers 47, channels 45 and 48, cavities 49 and channels a, a', etc.

Disposed to receive liquid from the discharge member 52 is a relatively small chamber 55 having a discharge outlet 56 in the bottom thereof. There is also provided a chamber 58 for housing a synchronous or constant speed reversible motor indicated by the numeral 60.

The operation of the rotor is as follows:

For a high feed, the rotor will rotate in a counter-clockwise direction as indicated in Fig. 5. Liquid is scooped up through an opening 45 as this opening passes through the liquid and as it moves upwardly the liquid flows downwardly into the large part of the chamber 47. As the rotor moves into a position where an unprimed passage a, b, c, or d, begins to slope downwardly, as, in say, a two o'clock position, the liquid will flow from the large end of the chamber 47 through such passage and will be discharged through one of the axial passages 50.

When the direction of rotation of the rotor is reversed, it will, of course, travel in a clockwise direction as seen in Fig. 5. When thus rotating a relatively small quantity of liquid will flow into a chamber 47 by gravity when a passage 45 is submerged and when the chamber 47 reaches approximately a nine o'clock position the liquid therein will flow down through the passage 48 collecting in the cavity 49. When the cavity 47 reaches approximately a ten o'clock position liquid will flow down therefrom through one of the primed passages a', b', etc., which happens to be associated therewith, discharging through one of the axial orifices 50 into the chamber 55, whence it is discharged to a burner or wherever desired, through the outlet 56.

In a chamber 63 which communicates with the main chamber 25 by means of a passage 64 is an emergency valve indicated generally by the numeral 66. This valve comprises a spring-pressed plunger 67 which normally closes a passage 69 to the feed outlet 56. The valve stem or plunger 67 is normally retained against the action of spring 68 in a depressed position closing the outlet port from the chamber 63 by means of a bimetallic strip 70 secured to which is a suitable electrical heater element 72. (Fig. 3.)

It will be understood that when the electrical current for any reason is cut off and consequently the bimetallic element 70 becomes cold, this element will flex upwardly, permitting the valve stem 67 to rise by the action of its spring 68, opening the auxiliary discharge port. In such event, of course, liquid will continue to be fed despite the fact that the rotor is no longer operating and, although the liquid fed will not be metered, a flow of liquid will nevertheless continue so that the burner, if such is being fed, will remain in operation. Figs. 3 and 4 show the auxiliary valve 66 in operation under such emergency conditions.

Fig. 3 shows a suitable electrical hook-up which may be employed in connection with my invention. Conductors 75 convey electric current from a suitable source, such as a house lighting circuit, through a transformer 76 to a room thermostat indicated by the numeral 78 which in turn controls the direction of the constant speed reversible motor 60. It will be understood, of course, that when the thermostat 78 calls for heat the motor will be so controlled as to operate the rotor in a counter-clockwise direction as shown in Fig. 5, whereas when the thermostat calls for no heat or low heat, the motor will be reversed so as to rotate the rotor in the opposite direction. (The low feed will usually be adjusted for a pilot feed.) Suitable conductors 80 control the heater element 72 for the bimetal while a service switch 82 may throw the entire device in or out of operation.

Means is provided for leveling the device, which may be in the form of sockets S, S cast integrally with the base of the receptacle 10, into which screws (not shown) may be threaded. Three of such sockets and screws will usually be adequate.

From the above it will be apparent that I have provided a device with an exceptionally accurate feed both for a high rate and a low rate of liquid delivery and with numerous other advantages.

If it should be desired to save the expense of a reversible motor, a unidirectional synchronous motor may be used for the main feed and stopped by the thermostat when heat is no longer required. A pilot flame is maintained by suitable means when the rotor is idle.

Various modifications and changes coming within the spirit of my invention may suggest themselves to those skilled in the art, and hence, I do not wish to be limited to the specific forms shown or uses mentioned except to the extent indicated in the appended claims.

I claim:

1. A liquid metering device comprising a receptacle having a main liquid chamber and having a metering chamber separate therefrom, rotatable means for conveying liquid from said main chamber to said metering chamber, an electrical motor actuating said rotatable means, an emergency valve normally closing an emergency outlet, and means controlling said emergency valve so that upon stoppage of the electrical energy said emergency valve will open to permit escape of fluid from the main chamber.

2. A liquid metering device comprising a receptacle having a main liquid chamber and having a metering chamber separate therefrom, rotatable means for conveying liquid from said main chamber to said metering chamber, an electrical motor actuating said rotatable means, an emergency valve normally closing an emergency outlet, a heat responsive member normally closing said emergency valve, and an electrical heating element cooperatively disposed in relation to said heat responsive element and in circuit with said motor, whereby upon stoppage of said heating element will produce a reaction of said heat responsive element opening said valve to permit escape of fluid from the main chamber.

3. A liquid metering device comprising a receptacle having a main liquid chamber and having a metering chamber separate therefrom, a rotor for conveying liquid from said main chamber to said metering chamber, said rotor feeding different quantities of liquid in each direction of rotation, a reversible constant speed electric motor actuating said rotor, an emergency valve normally closing an emergency outlet, a heat responsive member normally closing said emergency valve, and an electrical heating element cooperatively disposed in relation to said heat responsive element and in circuit with said motor, whereby upon stoppage of the electrical energy the cooling of said heating element will produce a reaction of said heat responsive element opening said valve, and a heat responsive control device remote from the metering device for reversing said motor.

4. In a liquid metering device, a rotor provided with pockets having peripheral inlet openings, said rotor having a substantially axial discharge outlet and having connecting ducts between each of said pockets and said discharge outlet, said ducts being so arranged that when the rotor is rotating in one direction a relatively large quantity of liquid will be fed while, when the rotor is rotating in the opposite direction, a relatively small quantity of liquid will be fed.

5. In a liquid metering device, a rotor provided with pockets having peripheral inlet openings, said rotor having a substantially axial discharge outlet, and having a duct for each pocket so positioned that substantially the entire contents of the pocket may be discharged when the rotor is traveling in one direction, and also having an auxiliary pocket communicating with each main pocket and a discharge duct so positioned with reference to each of said main pockets that, when the rotor is moved in the reverse direction, a relatively small metered volume of liquid will be discharged.

6. In a liquid metering device, a rotor provided with pockets having peripheral inlet openings, said rotor having a substantially axial discharge outlet, a pair of substantially radial ducts for each of said pockets communicating with said discharge outlet, one of each pair leading from a part of the pocket remote from said inlet opening whereby substantially the entire contents of the pocket may be discharged when the rotor is traveling in one direction, the other duct of each pair leading from a reservoir of relatively low volume communicating with a pocket and so disposed that a relatively small metered volume of liquid will be discharged from the pocket when the rotor is traveling in the opposite direction.

7. A rotor as defined in claim 4 which comprises a pair of molded disc like members secured together.

8. A rotor as defined in claim 5 which comprises a pair of molded disc like members secured together.

9. A rotor as defined in claim 6 which comprises a pair of molded disc like members secured together.

ARTHUR V. SAMPSEL.